United States Patent [19]

Kimura

[11] Patent Number: 4,541,020

[45] Date of Patent: Sep. 10, 1985

[54] DATA RECORDING/REPRODUCING APPARATUS

[75] Inventor: Kenji Kimura, Tokyo, Japan

[73] Assignee: Olympus Optical Co., Ltd., Tokyo, Japan

[21] Appl. No.: 396,779

[22] Filed: Jul. 9, 1982

[30] Foreign Application Priority Data

Jul. 22, 1981 [JP] Japan ................. 56-114625

[51] Int. Cl.³ .............. H04N 5/782; G11B 21/04
[52] U.S. Cl. .................... 360/22; 360/33.1;
   360/27; 360/75; 360/73; 360/70; 358/213;
   358/335
[58] Field of Search ........... 358/213, 335, 906;
   360/22, 23, 9.1, 84, 33.1, 75, 70, 73, 27; 369/47, 48

[56] References Cited

U.S. PATENT DOCUMENTS

| | | | |
|---|---|---|---|
| 3,157,738 | 11/1964 | Okamura | 360/84 |
| 3,809,805 | 5/1974 | Kasprzak | 360/23 |
| 3,934,269 | 1/1976 | Fujita | 360/75 |
| 3,975,764 | 8/1976 | Koboyoshi | 360/23 |
| 4,199,793 | 4/1980 | Baldwin | 360/84 |
| 4,280,151 | 7/1981 | Tsunekawa | 360/9.1 |
| 4,318,146 | 3/1982 | Ike | 360/84 |
| 4,377,742 | 3/1983 | Kawabata et al. | 250/201 |

FOREIGN PATENT DOCUMENTS

| | | | |
|---|---|---|---|
| 2851680 | 6/1980 | Fed. Rep. of Germany | |
| 564992 | 6/1979 | Japan | 358/310 |
| 55-154882 | 12/1980 | Japan | |

Primary Examiner—Alan Faber
Attorney, Agent, or Firm—Frishauf, Holtz, Goodman & Woodward

[57] ABSTRACT

A data recording/reproducing apparatus simultaneously records parallel data in recording tracks the number of which corresponds to the number of parallel data to be recorded, and sequentially reproduces the contents of the recording tracks to form serial data. A plurality of video signals for cooperatively forming a single picture are used for the parallel data. When one picture is quartered, four parallel video signals are simultaneously recorded in four recording tracks. By reproducing the contents of the recording tracks for each track in a sequential manner, one serial video signal corresponding to the picture is obtained. With this arrangement, high resolution picture data obtained from a solid-state image pickup device can be recorded and reproduced without the use of a specially designed parallel/serial converter.

36 Claims, 20 Drawing Figures

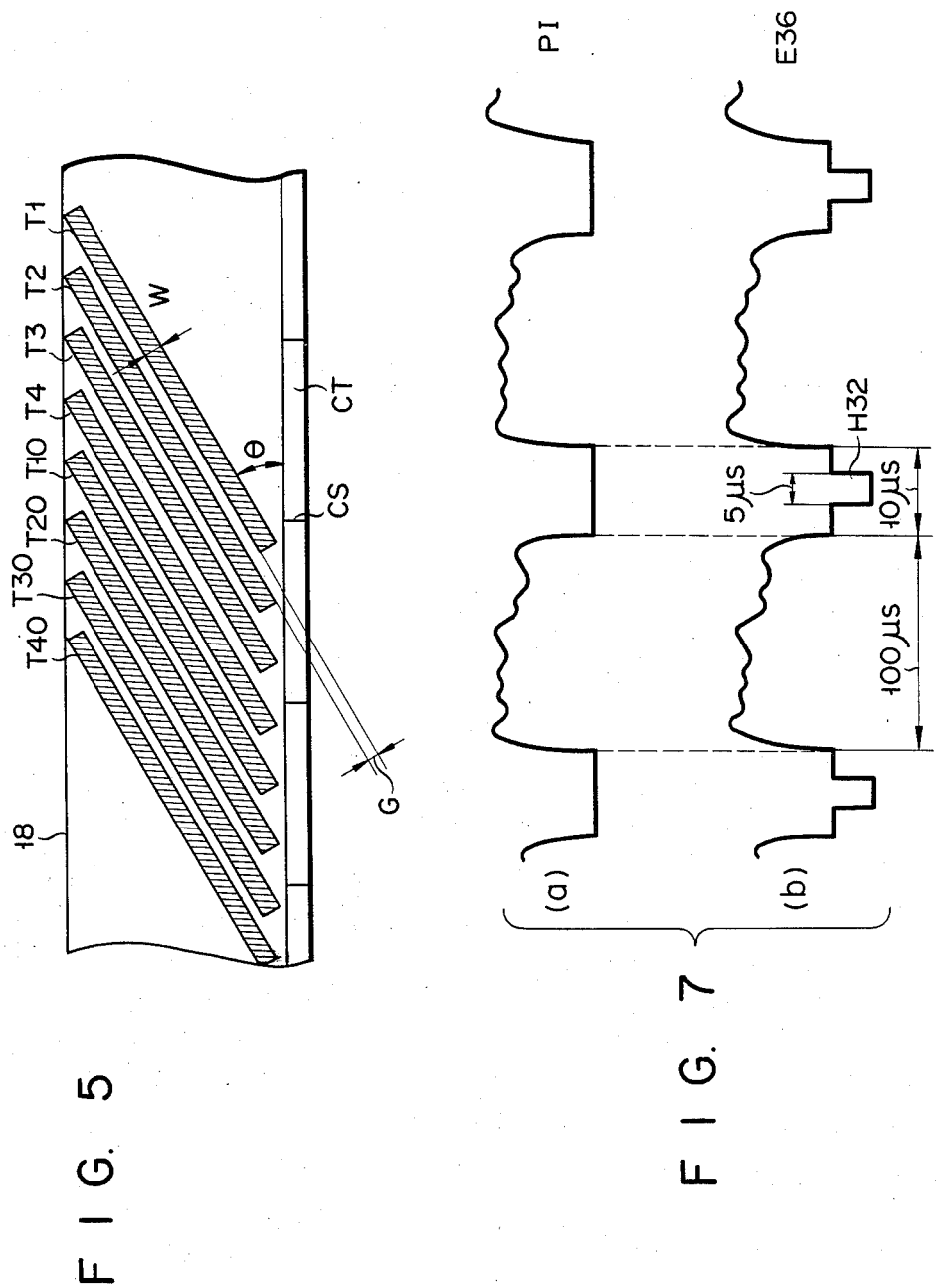

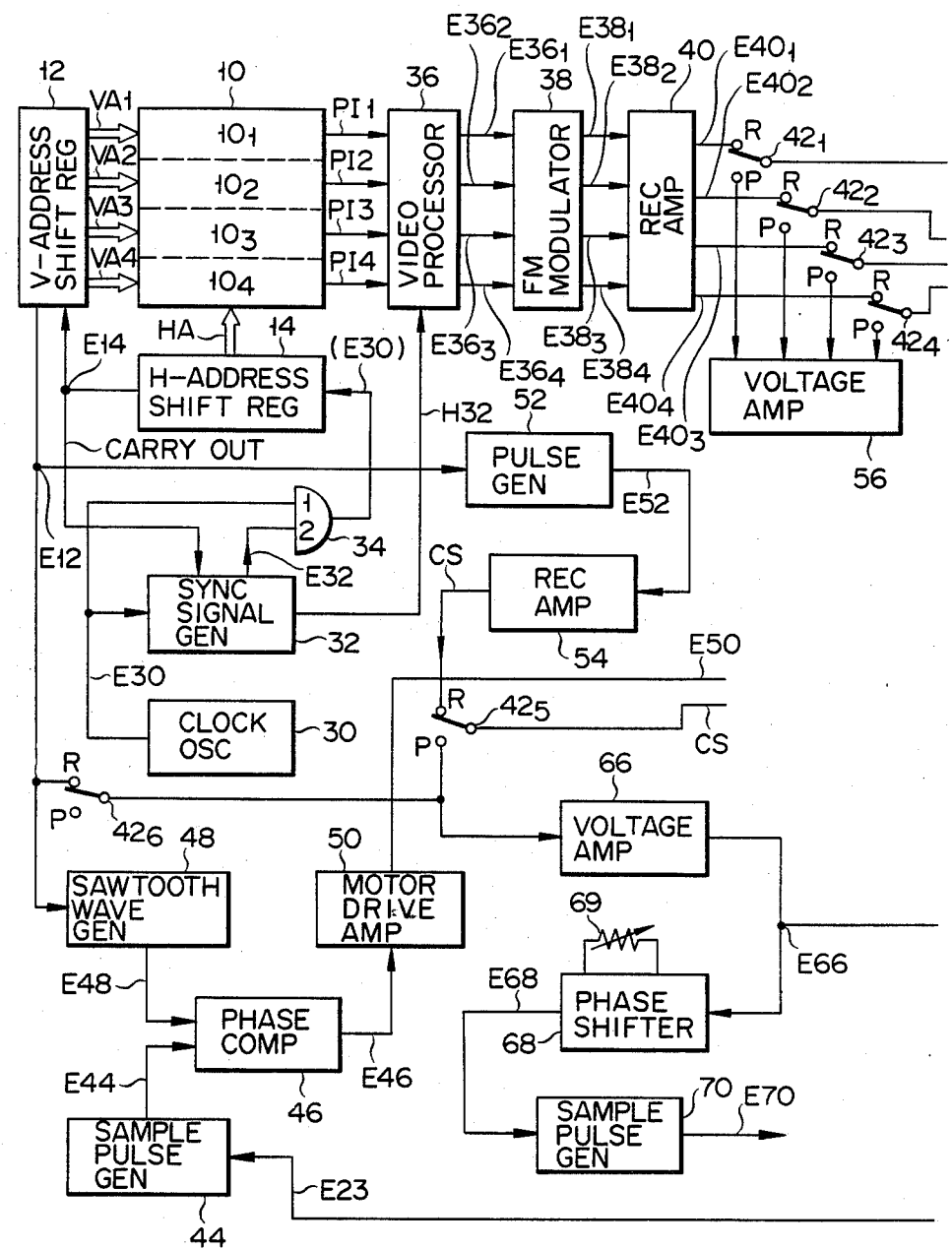
F I G. 6A

DATA RECORDING/REPRODUCING APPARATUS

BACKGROUND OF THE INVENTION

The present invention relates to a data recording/reproducing apparatus for recording and reproducing high density data, and more particularly, to a helical scan type VTR for recording image data at a high resolution in a parallel fashion and reproducing the same in a serial fashion.

In the field of picture information processing, there has been a demand for recording/reproducing a picture at a high resolution, for example, with the number of scanning lines at 1,000 or more. Let us consider a case in which a high resolution in which the number of picture elements is 1,000×1,000, for example, is obtained by using a solid-state image pickup device such as a two dimensional MOS image sensor. In this case, it is assumed that 1 $\mu$s is taken for reading out data per photoelectric cell forming a picture element in an image sensor. For reading out all data in the 1,000×1,000 cells, $10^6$ $\mu$s, or 1 sec, is taken. Thus, there is a time lag of one second from the instant that the first cell data is read out until the $10^6$-th cell data is read out. The cell data correspond to an amount of charge and the charge amount is substantially proportional to an amount of radiated light, or an exposure time. For this reason, there is a large sensitivity difference between the photoelectric transfer sensitivity (stored charge amount) of the first cell and that of the $10^6$-th cell, resulting in a great deterioration of the picture quality. In an extreme case, the saturation of the cell takes place during the reading of the picture data, failing to have a proper picture data.

The problem can be solved in the following way. As shown in FIG. 1, an image sensor 10 or 1,000×1,000 cells is divided into four imaging blocks $10_1$ to $10_4$, each block having 1,000 cells×250 cells, for example. One imaging block can be considered to have 250 lines each containing 1,000 picture elements. 1,000 cells on each horizontal scanning line are equidistantly arranged thereby to obtain 1,000 vertical scanning lines. Four output signals VA1 to VA4 from a vertical address shift register 12 are applied to each of the blocks $10_1$ to $10_4$. Horizontal addresses of the blocks $10_1$ to $10_4$ are specified by an output signal HA from a horizontal address shift register 14. The vertical scannings of the blocks $10_1$ to $10_4$ are performed in a parallel fashion by the four output signals VA1 to VA4. All the horizontal scannings of the blocks $10_1$ to $10_4$ are simultaneously performed by the signal HA. In this way, the picture data of the four blocks can be obtained parallel or time-divisionally.

As described above, when one picture screen is divided into four parallel picture data, the scanning time of one picture can be reduced to ¼ second. Further, if the number of the divided picture data is 16, the picture data of one picture screen can be taken out for 1/16 second. In this way, the deterioration of the picture quality due to a variation of the cell sensitivity can be limited to a low degree. For recording the parallel divided picture data into an ordinary helical scan type VTR, the data must be subjected to the parallel to serial data conversion. More particularly, the four parallel data are temporarily stored into memories of four blocks, and then these data are sequentially read out to provide serial picture data. Such memory requires a large capacity and a relatively high speed operation, and therefore is expensive.

SUMMARY OF THE INVENTION

Accordingly, an object of the present invention is to provide a data recording/reproducing apparatus which can record the data in parallel fashion and reproduce the same in serial fashion without using a specially designed parallel/serial data converter.

To achieve the above object, the present invention simultaneously records the parallel data in recording tracks of which the number corresponds to the number of the parallel data to be recorded, and sequentially reproduces the contents in the recording tracks, thereby providing serial data.

A plurality of video signals cooperatively forming a single picture data can be used for the parallel data. For example, when a single picture is divided into four imaging blocks, four parallel picture signals forming a single picture are simultaneously recorded into four recording tracks. The contents of the recording tracks are sequentially reproduced for each track, so that a serial picture signal corresponding to the one picture is obtained. In this way, the high resolution picture data obtained from the solid-state image pickup device can be recorded and reproduced without using a special designed parallel/serial data converter.

BRIEF DESCRIPTION OF THE DRAWINGS

FIG. 5 illustrates recording tracks formed by the four recording heads shown in FIGS. 3 or 4;

FIGS. 6A and 6B show block diagrams cooperatively illustrating a data recording/reproducing apparatus (helical scan type 4-head VTR) according to one embodiment of the present invention;

FIGS. 7(a) and 7(b) illustrate input and output waveforms in a video processor 36 shown in FIG. 6A;

DETAILED DESCRIPTION OF THE PREFERRED EMBODIMENTS

Before proceeding with the description of the embodiments of the invention, it should be understood that like reference symbols are used to designate like portions through the drawings for simplicity of illustration and that the components designated by like reference symbols may easily be replaced with each other or one another with minor change thereof by a person skilled in the art. An embodiment of a data recording/reproducing apparatus according to the present invention will be described referring the accompanying drawings.

Figure 1:
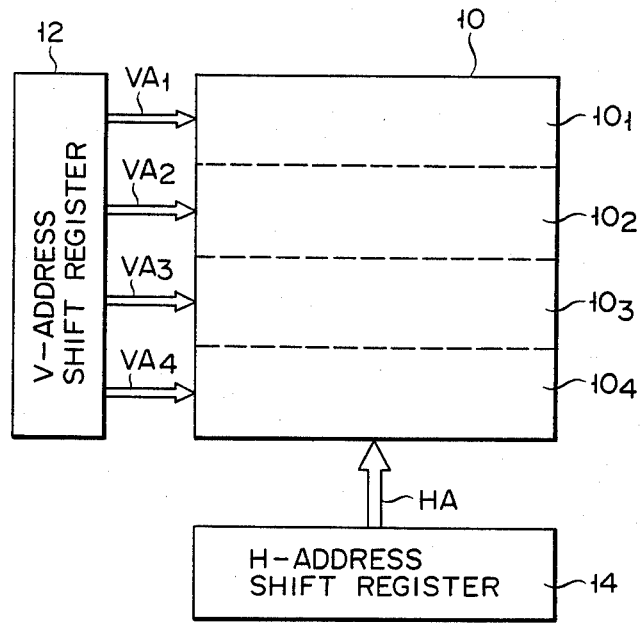
FIG. 1 shows an explanatory diagram for illustrating how to take out four parallel picture data from a single image sensor.
Figure 2:
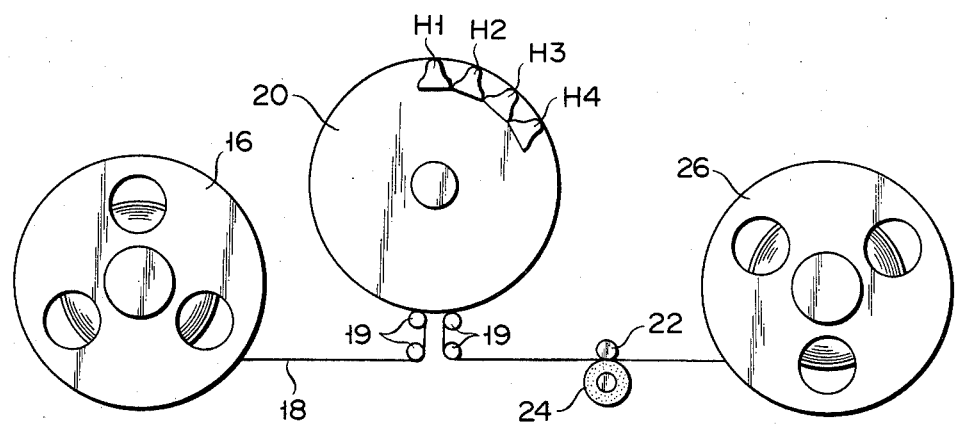
FIG. 2 illustrates a schematic diagram of the transport of a helical scan type VTR used as a recording/reproducing means used in an embodiment of the present invention.

FIG. 2 illustrates a tape transport of the helical scan type VTR used as a recording/reproducing means. A video tape 18 fed from a supply reel 16 is wound around the substantially entire periphery surface of the cylinder 20. The tape 18 wound around the cylinder 20 by about one turn is fed to a take-up reel 26 through a capstan 22 and a pinch roller 24. Four recording heads H1 to H4 are mounted on the peripheral surface of the cylinder 20.

Figure 3:
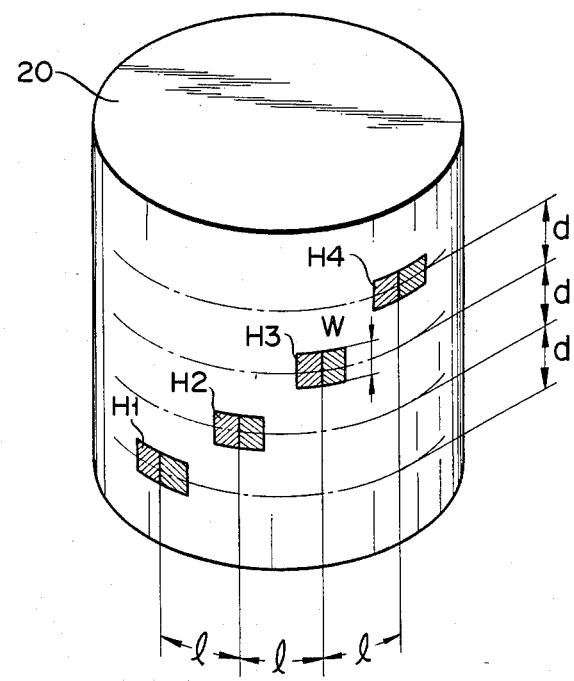
FIG. 3 illustrates a perspective view of a rotating cylinder used in the VTR in FIG. 2 in which four recording heads mounted to the rotating cylinder are exaggeratedly illustrated for the purpose of explanation.
Figure 4:
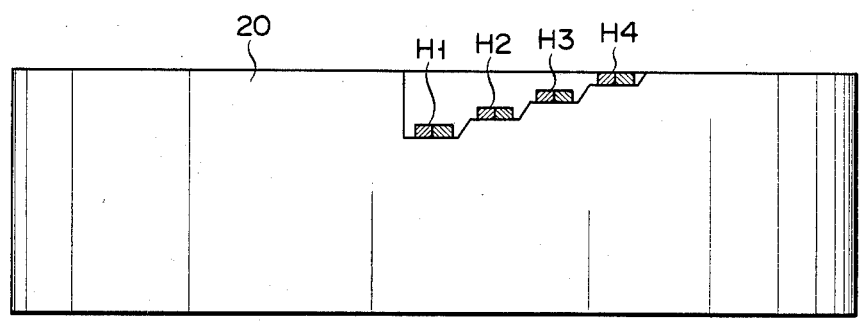
FIG. 4 illustrates a side view of the rotating cylinder in a more realistic manner than does FIG. 3.

FIG. 3 exaggeratedly shows how the recording heads (video heads) H1 to H4 are mounted to the rotating cylinder 20. FIG. 4 shows a practical arrangement of the four heads H1 to H4 mounted on the cylinder 20. The video tape 18 is obliquely wound around the cylinder 20. Accordingly, the heads H1 to H4 obliquely trace the tape 18, as shown in FIG. 5. When the cylinder 20 rotates once, four recording tracks T1 to T4 are formed on the tape 18. When the cylinder rotates one more time, four additional recording tracks T10 to T40 are formed. The tracks T1 and T10 are traced by the head H1; the tracks T2 and T20 by the head H2; the tracks T3 and T30 by the head H3; the tracks T4 and T40 by the head H4.

In the present embodiment, a distanced between adjacent recording heads of the heads H1 to H4 is 20 $\mu$m, and the effective track width W is 15 $\mu$m. Therefore, the track interval of the recording tracks T1 to T4, i.e., the guard band G, is 5 $\mu$m. Further, an inclination angle $\phi$ of the recording track is selected to 10°. It is very difficult to align the four head gaps from the standpoint of space. For this reason, the heads H1 to H4 are arranged in a staggered fashion in the present embodiment, with a separation of a staggering distance l, as shown in FIG. 3. In the case of an in-line head, the distance l=0.

Figure 6B:
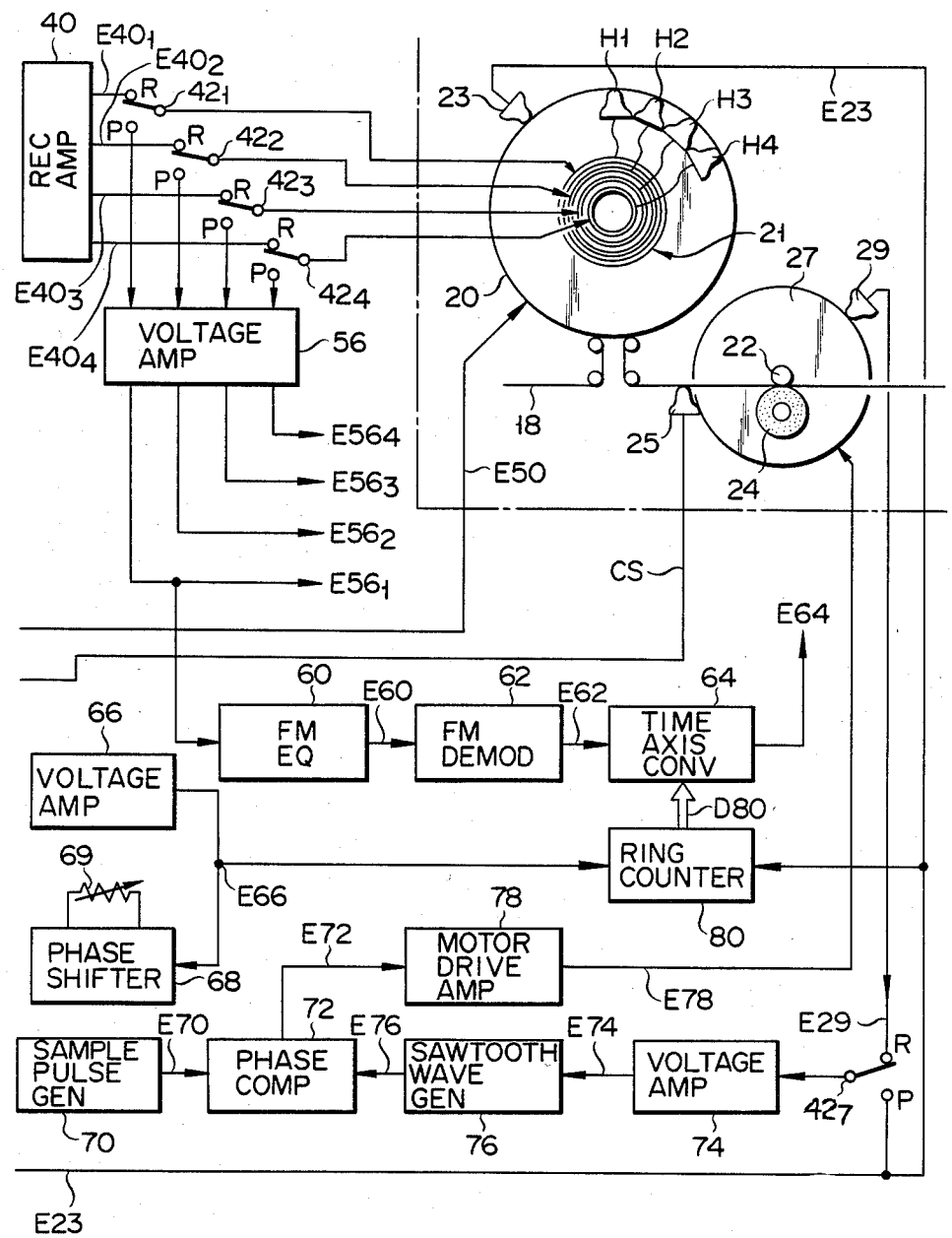
Figure 8:
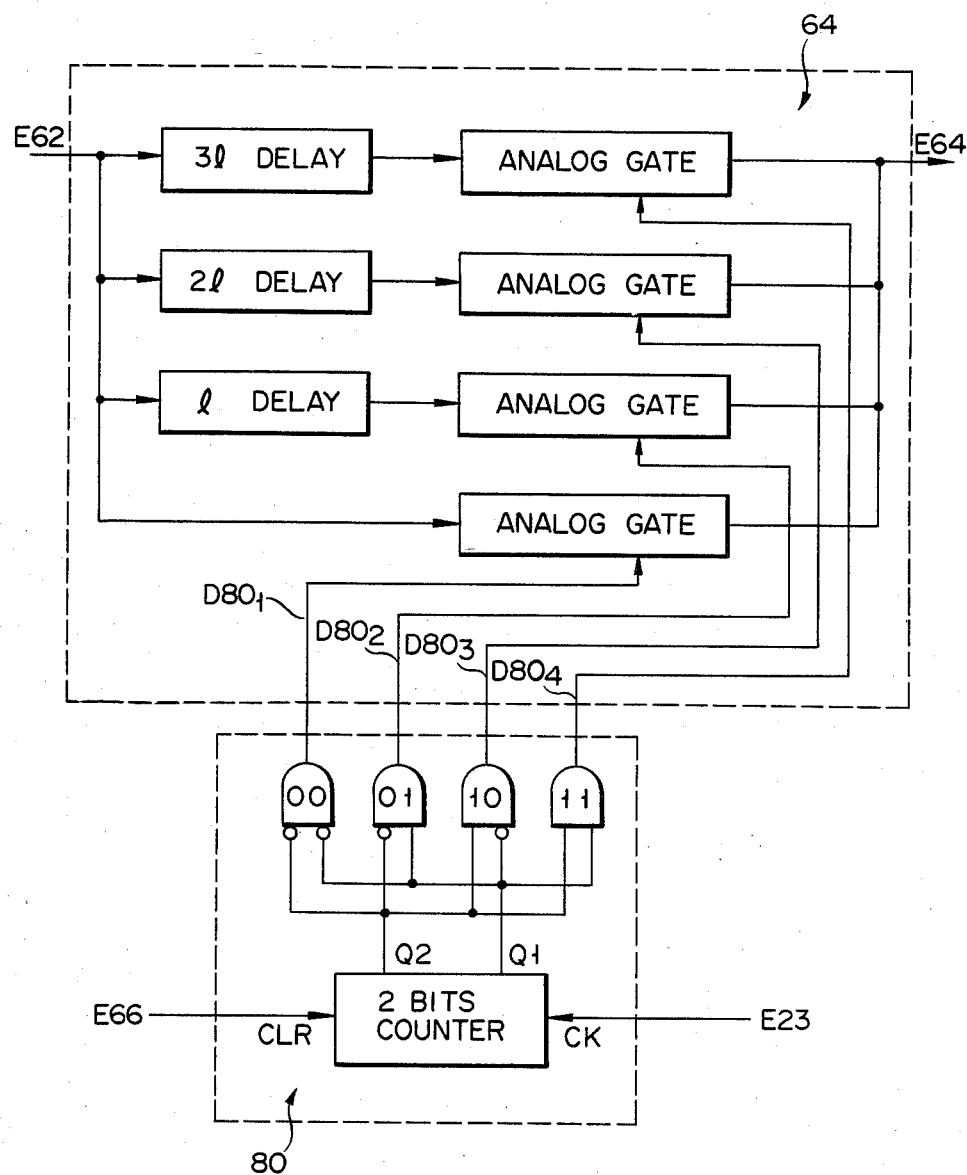
FIG. 8 is a block diagram of a circuit arrangement of a time-axis converter shown in FIG. 6B.
Figure 9:
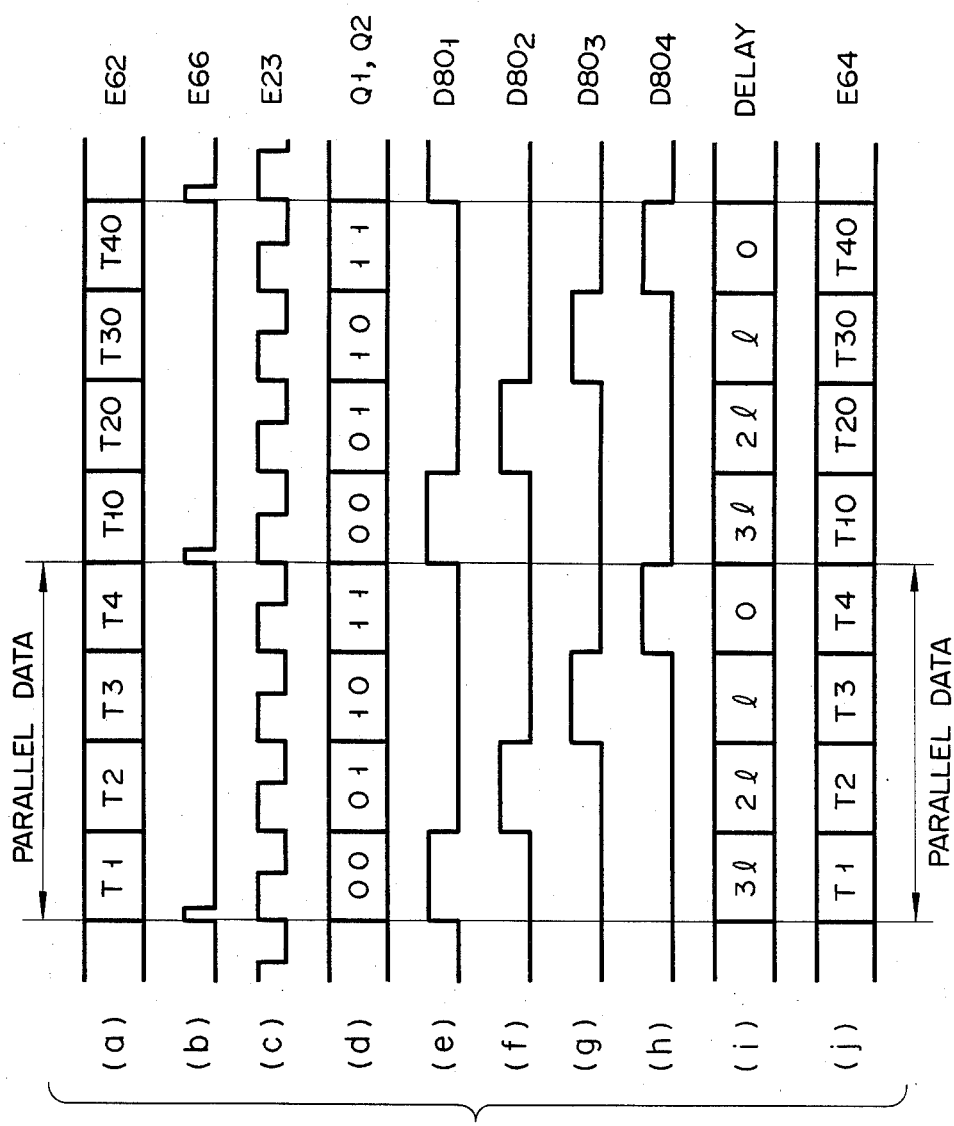
FIGS. 9(a) to 9(j) show timing charts useful in explaining the operation of the circuit shown in FIG. 8.

FIGS. 6A and 6B cooperatively show an arrangement of a recording/reproducing apparatus which is an embodiment according to the present invention. An optical image of an object (not shown) is formed on a light receiving surface of the image sensor 10. The present embodiment employs an ordinary MOS image sensor with 1,000×1,000 cells. The photoelectric cells of the image sensor 10 are divided into quarters in a vertical scanning direction, for imaging blocks $10_1$ to $10_4$ each containing 1,000×250 cells. The horizontal scanning of each imaging block is performed by a horizontal address shift register 14 of 1,000 bits. The vertical scanning is performed by a vertical address shift register 12 of 4×250 bits. A clock oscillator 30 generates a clock signal E30 of 10 MHz. For forming a color subcarrier $f_{sc}$ (3.58 MHz) in the NTSC system, $3f_{sc}$ (10.7 MHz), i.e., three times $f_{sc}$, may be used for the signal E30. The clock signal E30 is applied to a sync signal generator 32 and to a first input terminal of an AND gate 34. A gate signal E32 for horizontal blanking is applied from the generator 32 to a second input terminal of the AND gate 34. During a period that a gate signal E32 is logic "1", the clock signal E30 is applied to the horizontal shift register 14 through the AND gate 34. The shift register 14 is clocked by the clock signal E30 at 10 MHz and performs a bit shift every 0.1 $\mu$s to produce a horizontal address specifying output signal HA.

The horizontal shift register 14 is counted up every 1,000 bit shift count and produces a horizontal carry out E14. The carry out E14 is applied to the vertical shift register 12 and the generator 32. The shift register 12 has four vertical shift registers each of 250 bits which are clocked by the carry output E14. The generator 32 forms the gate signal E32 with the pulse width 10 $\mu$s using the clock signal E30 and the carry out E14. The signal E32 stops the shift counting of the horizontal shift register 14 for 10 $\mu$s. The time taken for the shift register 14 to shift-count 1,000 bits is 0.1 $\mu$s×1,000=100 $\mu$s. Since the horizontal blanking period is 10 $\mu$s, the horizontal carry out E14 is generated every 110 $\mu$s. Four vertical shift registers of 250 bits in the vertical shift register 12 produce vertical address designating output signals VA1 to VA4 which are each bit shifted every 110 $\mu$s. When the carry out E14 of 250 pulses are produced, the 250-bit vertical shift register is counted up to produce a vertical carry output E12. The period 110 $\mu$s of the carry out E14 corresponds to the horizontal scanning period. The period 110 $\mu$s×250=27.5 ms of the carry out E12 corresponds to the vertical scanning period. Thus, the picture data of one picture can be obtained for 27.5 ms.

The horizontal address specifying output signal HA is applied to the horizontal switching MOS transistor (not shown) provided in the image sensor 10. The four vertical address designating output signals VA1 to VA4 are applied to MOS transistors for vertical buffers (not shown) in the imaging blocks $10_1$ to $10_4$. The signal corresponding to the charge quantity in the cell at a location addressed by the signals VA1 and HA is then produced from the image sensor 10 in a sequence. The signal produced is an image data PI1 of the imaging block $10_1$. In a similar way, image data PI2 to PI4 are produced in succession from the imaging blocks $10_2$ to $10_4$. These data PI1 to PI4 are parallel. The four parallel image data PI1 to PI4 are applied to a video processor 36. The processor 36 contains ordinarily constructed video processors of 4 channels for individually processing the image data PI1 to PI4. Each of these video processors may be the video processor for a television camera which includes circuitries, such as a gamma ($\gamma$) correction circuit and a clamping circuit, for producing a general composite video signal. A horizontal sync signal H32 is applied from the sync signal generator 32 to the processor 36. The signal H32 is generated in phase with the center of the gate signal E32, and has a pulse width of 5 $\mu$s. The processor 36 forms composite video signals $E36_1$ to $E36_4$ using the image data PI1 to PI4.

FIGS. 7(a) and 7(b) show examples of the image data PI (for example, PI1) and the composite video signal E36 (for example, $E36_1$).

The composite video signals $E36_1$ to $E36_4$ are applied to an FM modulator 38 with a circuit arrangement of 4-channel FM inputs. The center frequency of the FM modulator 38 is set at an optimum value on the basis of an electromagnetic converting characteristic in a magnetic recording/reproducing system. The optimum center frequency is determined on the relative speed of the video heads H1 to H4 to the video tape 18. In the present embodiment, at the gray level of the video signal, the center frequency is set at 12 MHz. FM-modulated signals $E38_1$ to $E38_4$ produced from the modulator 38 are applied to a record amplifier 40 with a 4-channel arrangement. The record signals $E40_1$ to $E40_4$ current-amplified by the amplifier 40 are applied to R terminals of recording/reproducing select switches $42_1$ to $42_4$, respectively. The record signals $E40_1$ to $E40_4$ taken out through the select switches $42_1$ to $42_4$ are applied respectively to the video heads H1 to H4 by way of a rotary transformer 21. The rotary transformer 21 is provided with primary stationary coils and secondary rotating coils and continuously applies the signals $E40_1$ to $E40_4$ to the rotating heads H1 to H4.

When the rotating cylinder 20 with the video heads H1 to H4 mounted thereto rotates once, four recording tracks T1 to T4 are formed on the video tape 18, as shown in FIG. 5. The FM-modulated picture data of one picture is stored in the tracks T1 to T4. Similarly, the picture data corresponding to the next picture is recorded into the tracks T10 to T40 upon the succeeding rotation of the cylinder 20.

In the present embodiment, one rotation of the cylinder 20 corresponds to one picture. For this reason, the scannings of the imaging blocks $10_1$ to $10_4$ in the image sensor 10 must be made to correspond to one rotation of the cylinder 20. In the present embodiment, this is satisfied by controlling the rotating period of the cylinder 20. As described above, the picture data PI1 to PI4 of one picture are obtained every 27.5 ms, as previously stated. Accordingly, the rotation period of the cylinder 20 is controlled to 27.5 ms. This control is realized by synchronizing the rotation of the cylinder 20 with the vertical carry out E12 having the period of 27.5 ms.

The rotation of the rotating cylinder 20 is sensed by a cylinder rotating sensor 23. The sensor 23, made up of a Hall element, a photointerrupter, or the like, produces, for example, one cylinder rotation detecting pulse E23 for one rotation of the cylinder 20. The detecting pulse E23 is applied to a sampling pulse generator 44. The generator 44 is triggered by the pulse E23 to produce a sampling pulse E44 which in turn is applied to a phase comparator 46. A sawtooth wave signal E48 is applied from a sawtooth wave generator 48 to the comparator 46. The generator 48 is triggered by the vertical carry out E12 to produce a sawtooth wave signal E48 with the period 27.5 ms. The comparator 46 phase-compares the signal E48 with the pulse E44 to produce a comparing output signal E46 at a voltage proportional to a phase difference between the signals E48 and the pulse E44. The comparing output signal E46 is amplified by the motor drive amplifier 50 to be a cylinder motor drive signal E50. The signal E50 is applied to a DC servo motor for cylinder drive (not shown). The cylinder servo motor, in cooperation with the components 20, 23, 44, 46, 48 and 50, makes up a phase control type servo system. Through the operation of the servo system, one rotation of the cylinder 20 accurately synchronizes with the period 27.5 ms of one picture.

As the result of the servo operation, the picture data corresponding to the horizontal scanning lines of 250 are accurately and simultaneously recorded in the recording tracks T1 to T4 shown in FIG. 5. In this way, the picture data (one field) of 1,000 horizontal scanning lines are stored in the four tracks T1 to T4 every time the cylinder 20 rotates once.

For controlling the transportation of the video tape 18, a control signal is recorded in the tape 18. The control signal is formed using the vertical carry out E12. The carry out E12 is inputted to a pulse generator 52. The generator 52 is triggered by the carry out E12 to produce a control pulse E52. The pulse E52 is amplified by a record amplifier 54 to be a control signal CS. The control signal CS is applied to the control head 25 through the contact R of a relay switch $42_5$. Then, as shown in FIG. 5, a control signal CS corresponding to the period 27.5 ms of one picture is recorded in the control track CT of the video tape 18.

The transportation control of the video tape 18 by the capstan 22 is performed in the following manner: The carry output E12 is inputted to a voltage amplifier 66 through the terminal R of a selector switch $42_6$. The output E66 of the amplifier 66 is applied to a phase shift circuit 68 where it is converted into a phase shifted pulse E68 with the same period as that of the carry out E12. The pulse E68 has a given phase difference with respect to the vertical carry out E12. The phase difference is adjusted by a phase-shift adjuster 69. The adjuster 69 is used for a tracking adjustment to be described later. The pulse E68 is inputted to a sampling pulse generator 70. The generator 70 is then triggered by the pulse E68 to produce a sampling pulse E70 with the same period as that of the vertical carry out E12 and having a given phase difference with respect to the carry out signal E12. The sampling pulse E70 is applied to a phase comparator 72.

The rotation speed of the capstan 22 is sensed by the capstan rotation sensor 29 coupled with the capstan motor 27. The sensor 29 may be the same photointerrupter as that of the cylinder rotation sensor 23. If the capstan motor 27 is an FG servo motor, the frequency generator (FG) may be used as the sensor 29. The sensor 29 produces a given number of capstan rotation sensing pulses E29 when the video tape 18 is transported a distance corresponding to one rotation of the cylinder 20. The sensing pulse E29 is applied to a voltage amplifier 74 via the terminal R of a selector switch $42_7$. The output E74 of the amplifier 74 is applied to a sawtooth generator 76. The generator 76 is triggered by the output signal E74 to produce a sawtooth wave signal E76 with a period (27.5 ms) corresponding to the rotation speed of the capstan 22, i.e., the tape transportation speed. The sawtooth wave signal E76 is applied to the comparator 72. The comparator 72 phase-compares the signal E76 with the sampling pulse E70 to produce the comparing output signal E72. The comparing output signal E72 is amplified by the motor drive amplifier 78 to be used as a capstan motor drive signal E78. The signal E78 is applied to the capstan motor 27 of the DC servo type.

The capstan motor 27, in cooperation with the components 29, and 66 to 78, forms a phase control type servo system. The transportation speed of the video tape 18 is accurately synchronized with the vertical carry out E12 (27.5 ms period). The tape transportation speed in a record mode is so selected that, for example, in FIG. 5, the heads H1 to H4 which have traced the tracks T1 to T4 with the first cylinder rotation, trace the tracks T10 to T40 with the next cylinder rotation.

An output signal from the control head, i.e., a reproducing control signal CS, in a reproduction mode is applied to the voltage amplifier 66 through the contact P of the selector switch $42_5$. The output signal E66 amplified by the amplifier 66 is passed through the phase shift circuit 68 and the sampling pulse generator 70 to be the sampling pulse E70. The pulse E70 is applied to the phase comparator 72. The output pulse E23 from the cylinder rotation sensor 23 is applied through the contact P of the selector switch $42_7$ to the voltage amplifier 74. The output signal E74 of the amplifier 74 is converted via the sawtooth wave generator 76 to the sawtooth wave signal E76 which is then transferred to the comparator 72. The output signal E72 from the comparator 72 is used as a tape speed error signal which in turn is applied to the capstan motor drive amplifier 78. At this time, the motor 27 is so controlled in its rotating speed as to synchronize in phase with the control signal CS and the cylinder rotation sensing pulse E23. Thus, the capstan motor 27 rotates at a fixed speed in synchronism with the rotation of the cylinder 20. The tape speed at this time is so controlled that the head H1, which has traced the track T1 in FIG. 5 with the first rotation of the cylinder 20, traces the track T2 with the next rotation of the cylinder 20. The rotation control of the cylinder 20 in a reproduction mode is performed using the vertical carry out E12 and the cylinder rotation sensing pulse E23. The rotation control is the same as that in a record mode.

It is necessary to accurately coincide the gap center of the video head H1 with the center of each of the tracks T1 to T4. This coinciding operation, i.e., the tracking adjustment, is performed by changing an offset amount of the servo loop by means of the phase shift adjuster 69. After the tracking adjustment, the head H1 traces the center lines of the recording tracks T1 to T4 in succession through the rotation control of the cylinder 20 and the capstan 22.

In order to reproduce the image data recorded in the video tape 18, the recording/reproducing select switches $42_1$ to $42_4$ are turned to the contact P. The reproduced output signals from the video heads H1 to H4 are then applied through the rotary transformer 21 to the voltage amplifier 56 having the 4-channel circuit arrangement. The amplifier 56 produces the reproduced FM signals $E56_1$ to $E56_4$ corresponding to the reproduced signals from the heads H1 to H4.

Since the reproduced FM signals $E56_1$ to $E56_4$ are parallel signals for four lines, these signals must be subjected to the parallel/serial conversion. This conversion is made by the tracks T1 to T4 which store one picture data being traced by a single head in a time sequence. More specifically, a signal $E56_1$ corresponding to the output signal from the first video head H1 is inputted to an FM equalizer 60. The FM equalizer 60 compensates a level-down of a response in the side band region dependent on a magnetic conversion characteristic (frequency response) of the head H1. The output signal E60 of the FM equalizer 60 is applied to an FM demodulator 62. The FM demodulator 62 demodulates the compensated FM signal from the FM equalizer 60 to produce a reproduced video signal E62. The signal E62 is inputted to a time-axis converter 64. The converter 64 delays the signal E62 according to delay data D80 to provide a video signal E64.

The time-axis converter 64 compensates or corrects shifts of the time axes of the tracks T1 to T4 which are caused by the staggering distance l of the heads H1 to H4 shown in FIG. 3. The signal delay time in the converter 64 is determined by the delay data D80 derived from a ring counter 80 which receives the pulses E23 and E66. The converter 64 gives a signal delay corresponding to the staggering distance 3l, by the data $D80_1$, when the head H1 traces the track T1 in FIG. 5. Then, the head H1 traces the track T2. At this time, the counter 80 counts the cylinder rotation sensing pulse E23 to produce the delay data $D80_2$. When the head H1 traces the track T2, the converter 64 provides a signal delay of the staggering distance of 2l. Similarly, when the head H1 traces the track T3, the converter delays the signal by a time delay corresponding to the staggering distance l.

No delay of the signal is given for the trace of the track T4. When the head H1 traces the track T10, the counter 80 is cleared by the signal E66, the amount of the signal delay is returned to 3l. Subsequently, the recording tracks are traced in succession by the head H1 while the signal delay time is switched to the proper ones. In this way, the converter 64 produces a serial video signal E64 which has been converted. The serial video signal E64 does not contain the phase-shift due to the staggering distances 1 to 3l, but rather, accurately corresponds to the picture data sensed by the image sensor 10.

As described above, the data recording/reproducing apparatus according to the present invention records a plurality of parallel picture data in parallel fashion and can directly reproduce the recorded parallel data in the form of serial picture data.

The present invention is not limited to the embodiment described in the specification and shown in the accompanying drawings, and various changes and modifications can be made within the scope of the present invention. For example, the number of picture elements of the image sensor 10, which is 1,000 cells × 1,000 cells in the embodiment described above, may be $2^n$, for example, 256 cells × 512 cells ($2^8 \times 2^9$ or 2,048 cells × 2,048 cells ($2^{11} \times 2^{11}$). The number of the divided picture segments in one picture is not limited to the four segments as used in the above embodiment. For example, one picture may be divided into two segments using an image sensor of 300 cells × 400 cells. Alternately, it may be divided into 10 segments using an image sensor of 2,000 cells × 2,000 cells. In the case of the two segments, the parallel picture data number two and therefore two recording heads are required. When the frequency characteristics of the recording/reproducing system is sufficiently wide, the two parallel picture signals are converted into a single composite picture signal and the composite picture signal may be recorded and reproduced by using a single head.

In FIG. 6, there is additionally provided a parallel/serial converter in which the reproduced FM signals $E56_1$ to $E56_4$ (parallel data) are temporarily stored in a semiconductor memory device and the recorded data are sequentially read out. In this case, a still reproduction of one picture can be made by making use of the output signals from the memory device.

In the FIG. 6 embodiment, the odd numbered horizontal scannings are performed in the scanning of the first field in order to perform interlace scanning. The even numbered scannings are then performed in the scanning of the second field.

The present invention is of course applicable to the recording and reproduction of general information, in addition to the color video signal in NTSC, PAL or SECAM television systems.

If a video head cylinder with an in-line arrangement (l=0) is employed instead of the stagger arranged heads as shown in FIGS. 3 or 4, the time-axis converter 64 and the ring counter 80 may be omitted.

What is claimed is:

1. A data recording/reproducing apparatus, comprising:
   signal source means for providing a plurality of different recording signals cooperatively forming a specific data, said signal source means including a solid-state image pickup device comprising at least two imaging blocks containing a plurality of photoelectric cells, and wherein said solid-state image pickup device provides picture data corresponding to said specific data and the picture data of each of said imaging blocks corresponds to each of said recording signals;

recording means coupled to said signal source means for recording said recording signals into a plurality of recording tracks formed in a recording medium so that said recording signals are parallel recorded simultaneously in the plurality of recording tracks, wherein the number of recording tracks corresponds to the number of said recording signals; and reproducing means coupled to said recording medium for sequentially reproducing from one of said recording tracks a reproducing signal corresponding to one of said recording signals and for converting said recording signals recorded in parallel fashion into serial reproduced signals, said sequential reproducing being carried out for every recording track;

said recording means includes rotating recording heads the number of which is equal to the number of said recording signals, said reproducing means includes a single rotating reproducing head, said rotating recording heads simultaneously record the plurality of said recording signals into said recording tracks of the same number as that of said rotating recording heads, and said rotating reproducing head sequentially reproduces the contents in said recording tracks recorded by said rotating recording heads.

2. The apparatus of claim 1, wherein head gaps of said rotating recording heads are staggered, and of said recording heads, the head used for recording the earliest recording signal of said recording signals is used for said rotating reproducing head.

3. The apparatus of claim 2, wherein said recording means includes control signal recording means for recording a control signal representing a timing to make the simultaneous recording of said recording signals by said rotating recording heads, together with said recording signals into said recording medium.

4. The apparatus of claim 3, wherein said reproducing means includes:
clear signal reproducing means for reproducing a clear signal corresponding to said control signal from said recording medium when said rotating reproducing head traces the first track of the plurality of said recording tracks;
count signal generating means for generating a count signal representing a timing of tracing one of said recording tracks by said rotating reproducing head;
count means arranged to be cleared by said clear signal, for counting said count signal to produce count data indicating which of the plurality of said recording tracks is traced by said rotating reproducing head; and
delay means for delaying a signal reproduced by said rotating reproducing head at a given rate, an amount of signal delay in said delay means being changed by said count data so that the reproduced signal of said recording signals simultaneously recorded is transformed into said reproduced output signals which are arranged sequentially in time.

5. The apparatus of claim 4, wherein said recording means includes means for synchronizing one rotation of said rotating recording heads with the simultaneous recording operation of the plurality of said recording signals.

6. The apparatus of claim 5, wherein said signal source means includes a two dimensional image sensor for generating said specific data, said sensor being divided into a plurality of two dimensional blocks corresponding to the number of said recording signals in the direction of a vertical axis in a plane of the two dimensional sensor;
vertical scanning means coupled to said image sensor for scanning said sensor in the vertical axis direction to generate a vertical carry out signal every time the vertical scanning is completed; and
said recording means includes:
means for transporting said recording medium;
transport sensing means coupled to said transporting means for generating a transporting signal corresponding to a transport speed of said recording medium; and
means coupled to said vertical scanning means, said transporting means, and said transport sensing means for phase-comparing said vertical carry out with said transport signal, to thereby phase-control said transport means so that the transport speed of said recording medium is synchronized with said vertical carry out.

7. The apparatus of claim 6, wherein said reproducing means includes:
control signal reproducing means for reproducing said control signal from said recording medium; and
means coupled with said control signal reproducing means, said count signal generating means and said transporting means for phase-comparing said control signal with said count signal to thereby phase-control said transport means so that said rotating reproducing head sequentially traces said recording tracks.

8. The apparatus of claim 7, wherein said phase control means includes phase shift means for making an adjustment so that said rotating reproducing head accurately traces said recording tracks, said phase shift means changing a phase difference between said control signal and said count signal.

9. The apparatus of claim 4, wherein said signal source means includes a two dimensional image sensor for generating said specific data, said sensor being divided into a plurality of two dimensional blocks corresponding to the number of said recording signals in the direction of a vertical axis in a plane of the two dimensional sensor;
vertical scanning means coupled to said image sensor for scanning said sensor in the vertical axis direction to generate a vertical carry out signal every time the vertical scanning is completed; and
said recording means includes:
means for transporting said recording medium;
transport sensing means coupled to said transporting means for generating a transporting signal corresponding to a transport speed of said recording medium; and
means coupled to said vertical scanning means, said transporting means, and said transport sensing means for phase-comparing said vertical carry out with said transport signal, to thereby phase-control said transport means so that the transport speed of said recording medium is synchronized with said vertical carry out.

10. The apparatus of claim 9, wherein said reproducing means includes:
control signal reproducing means for reproducing said control signal from said recording medium; and means coupled with said control signal reproducing means, said count signal generating means and said transporting means for phase-comparing said control signal with said count signal to thereby phase-control said transport means so that said rotating reproducing head sequentially traces said recording tracks.

11. The apparatus of claim 10, wherein said phase control means includes phase shift means for making an adjustment so that said rotating reproducing head accurately traces said recording tracks, said phase shift means changing a phase difference between said control signal and said count signal.

12. The apparatus of claim 3, wherein said recording means includes means for synchronizing one rotation of said rotating recording heads with the simultaneous recording operation of the plurality of said recording signals.

13. The apparatus of claim 12, wherein said signal source means includes a two dimensional image sensor for generating said specific data, said sensor being divided into a plurality of two dimensional blocks corresponding to the number of said recording signals in the direction of a vertical axis in a plane of the two dimensional sensor;
vertical scanning means coupled to said image sensor for scanning said sensor in the vertical axis direction to generate a vertical carry out signal every time the vertical scanning is completed; and
said recording means includes:
means for transporting said recording medium;
transport sensing means coupled to said transporting means for generating a transporting signal corresponding to a transport speed of said recording medium; and
means coupled to said vertical scanning means, said transporting means, and said transport sensing means for phase-comparing said vertical carry out with said transport signal, to thereby phase-control said transport means so that the transport speed of said recording medium is synchronized with said vertical carry out.

14. The apparatus of claim 13, wherein said reproducing means includes:
control signal reproducing means for reproducing said control signal from said recording medium; and
means coupled with said control signal reproducing means, said count signal generating means and said transporting means for phase-comparing said control signal with said count signal to thereby phase-control said transport means so that said rotating reproducing head sequentially traces said recording tracks.

15. The apparatus of claim 14, wherein said phase control means includes phase shift means for making an adjustment so that said rotating reproducing head accurately traces said recording tracks, said phase shift means changing a phase difference between said control signal and said count signal.

16. The apparatus of claim 2, wherein said recording means includes means for synchronizing one rotation of said rotating recording heads with the simultaneous recording operation of the plurality of said recording signals.

17. The apparatus of claim 16, wherein said signal source means includes a two dimensional image sensor for generating said specific data, said sensor being divided into a plurality of two dimensional blocks corresponding to the number of said recording signals in the direction of a vertical axis in a plane of the two dimensional sensor;
vertical scanning means coupled to said image sensor for scanning said sensor in the vertical axis direction to generate a vertical carry out signal every time the vertical scanning is completed; and
said recording means includes:
means for transporting said recording medium;
transport sensing means coupled to said transporting means for generating a transporting signal corresponding to a transport speed of said recording medium; and
means coupled to said vertical scanning means, said transporting means, and said transport sensing means for phase-comparing said vertical carry out with said transport signal, to thereby phase-control said transport means so that the transport speed of said recording medium is synchronized with said vertical carry out.

18. The apparatus of claim 17, wherein said reproducing means includes:
control signal reproducing means for reproducing said control signal from said recording medium; and
means coupled with said control signal reproducing means, said count signal generating means and said transporting means for phase-comparing said control signal with said count signal to thereby phase-control said transport means so that said rotating reproducing head sequentially traces said recording tracks.

19. The apparatus of claim 18, wherein said phase control means includes phase shift means for making an adjustment so that said rotating reproducing head accurately traces said recording tracks, said phase shift means changing a phase difference between said control signal and said count signal.

20. The apparatus of claim 1, wherein said recording means includes control signal recording means for recording a control signal representing a timing to make the simultaneous recording of said recording signals by said rotating recording heads, together with said recording signals into said recording medium.

21. The apparatus of claim 20, wherein said reproducing means includes:
clear signal reproducing means for reproducing a clear signal corresponding to said control signal from said recording medium when said rotating reproducing head traces the first track of the plurality of said recording tracks;
count signal generating means for generating a count signal representing a timing of tracing one of said recording tracks by said rotating reproducing head;
count means arranged to be cleared by said clear signal, for counting said count signal to produce count data indicating which of the plurality of said recording tracks is traced by said rotating reproducing head; and
delay means for delaying a signal reproduced by said rotating reproducing head at a given rate, an amount of signal delay in said delay means being changed by said count data so that the reproduced signal of said recording signals simultaneously recorded is transformed into said reproduced output signals which are arranged sequentially in time.

22. The apparatus of claim 21, wherein said recording means includes means for synchronizing one rotation of said rotating recording heads with the simultaneous recording operation of the plurality of said recording signals.

23. The apparatus of claim 22, wherein said signal source means includes a two dimensional image sensor for generating said specific data, said sensor being divided into a plurality of two dimensional blocks corresponding to the number of said recording signals in the direction of a vertical axis in a plane of the two dimensional sensor;
vertical scanning means coupled to said image sensor for scanning said sensor in the vertical axis direction to generate a vertical carry out signal every time the vertical scanning is completed; and
said recording means includes:
means for transporting said recording medium;
transport sensing means coupled to said transporting means for generating a transporting signal corresponding to a transport speed of said recording medium; and
means coupled to said vertical scanning means, said transporting means, and said transport sensing means for phase-comparing said vertical carry out with said transport signal, to thereby phase-control said transport means so that the transport speed of said recording medium is synchronized with said vertical carry out.

24. The apparatus of claim 23, wherein said reproducing means includes:
control signal reproducing means for reproducing said control signal from said recording medium; and
means coupled with said control signal reproducing means, said count signal generating means and said transporting means for phase-comparing said control signal with said count signal to thereby phase-control said transport means so that said rotating reproducing head sequentially traces said recording tracks.

25. The apparatus of claim 24, wherein said phase control means includes phase shift means for making an adjustment so that said rotating reproducing head accurately traces said recording tracks, said phase shift means changing a phase difference between said control signal and said count signal.

26. The apparatus of claim 21, wherein said signal source means includes a two dimensional image sensor for generating said specific data, said sensor being divided into a plurality of two dimensional blocks corresponding to the number of said recording signals in the direction of a vertical axis in a plane of the two dimensional sensor;
vertical scanning means coupled to said image sensor for scanning said sensor in the vertical axis direction to generate a vertical carry out signal every time the vertical scanning is completed; and
said recording means includes:
means for transporting said recording medium;
transport sensing means coupled to said transporting means for generating a transporting signal corresponding to a transport speed of said recording medium; and
means coupled to said vertical scanning means, said transporting means, and said transport sensing means for phase-comparing said vertical carry out with said transport signal, to thereby phase-control said transport means so that the transport speed of said recording medium is synchronized with said vertical carry out.

27. The apparatus of claim 26, wherein said reproducing means includes:
control signal reproducing means for reproducing said control signal from said recording medium; and
means coupled with said control signal reproducing means, said count signal generating means and said transporting means for phase-comparing said control signal with said count signal to thereby phase-control said transport means so that said rotating reproducing head sequentially traces said recording tracks.

28. The apparatus of claim 27, wherein said phase control means includes phase shift means for making an adjustment so that said rotating reproducing head accurately traces said recording tracks, said phase shift means changing a phase difference between said control signal and said count signal.

29. The apparatus of claim 20, wherein said recording means includes means for synchronizing one rotation of said rotating recording heads with the simultaneous recording operation of the plurality of said recording signals.

30. The apparatus of claim 29, wherein said signal source means includes a two dimensional image sensor for generating said specific data, said sensor being divided into a plurality of two dimensional blocks corresponding to the number of said recording signals in the direction of a vertical axis in a plane of the two dimensional sensor;
vertical scanning means coupled to said image sensor for scanning said sensor in the vertical axis direction to generate a vertical carry out signal every time the vertical scanning is completed; and
said recording means includes:
means for transporting said recording medium;
transport sensing means coupled to said transporting means for generating a transporting signal corresponding to a transport speed of said recording medium; and
means coupled to said vertical scanning means, said transporting means, and said transport sensing means for phase-comparing said vertical carry out with said transport signal, to thereby phase-control said transport means so that the transport speed of said recording medium is synchronized with said vertical carry out.

31. The apparatus of claim 30, wherein said reproducing means includes:
control signal reproducing means for reproducing said control signal from said recording medium; and
means coupled with said control signal reproducing means, said count signal generating means and said transporting means for phase-comparing said control signal with said count signal to thereby phase-control said transport means so that said rotating reproducing head sequentially traces said recording tracks.

32. The apparatus of claim 31, wherein said phase control means includes phase shift means for making an adjustment so that said rotating reproducing head accurately traces said recording tracks, said phase shift means changing a phase difference between said control signal and said count signal.

33. The apparatus of claim 1, wherein said recording means includes means for synchronizing one rotation of said rotating recording heads with the simultaneous recording operation of the plurality of said recording signals.

34. The apparatus of claim 33, wherein said signal source means includes a two dimensional image sensor for generating said specific data, said sensor being divided into a plurality of two dimensional blocks corresponding to the number of said recording signals in the direction of a vertical axis in a plane of the two dimensional sensor;

vertical scanning means coupled to said image sensor for scanning said sensor in the vertical axis direction to generate a vertical carry out signal every time the vertical scanning is completed; and said recording means includes:

means for transporting said recording medium;

transport sensing means coupled to said transporting means for generating a transporting signal corresponding to a transport speed of said recording medium; and means coupled to said vertical scanning means, said transporting means, and said transport sensing means for phase-comparing siad vertical carry out with said transport signal, to thereby phase-control said transport means so that the transport speed of said recording medium is synchronized with said vertical carry out.

35. The apparatus of claim 34, wherein said reproducing means includes:

control signal reproducing means for reproducing said control signal from said recording medium; and means coupled with said control signal reproducing means, said count signal generating means and said transporting means for phase-comparing said control signal with said count signal to thereby phase-control said transport means so that said rotating reproducing head sequentially traces said recording tracks.

36. The apparatus of claim 35, wherein said phase control means includes phase shift means for making an adjustment so that said rotating reproducing head accurately traces said recording tracks, said phase shift means changing a phase difference between said control signal and said count signal.

* * * * *